United States Patent Office 3,709,980
Patented Jan. 9, 1973

3,709,980
PRECIPITATION OF SILICEOUS PIGMENT
Raymond S. Chisholm, Pittsburgh, Pa., assignor to
PPG Industries, Inc., Pittsburgh, Pa.
No Drawing. Continuation of abandoned application Ser.
No. 852,102, Aug. 21, 1969. This application May 17,
1971, Ser. No. 144,250
Int. Cl. C01b 33/18, 33/32, 33/12
U.S. Cl. 423—339                        8 Claims

ABSTRACT OF THE DISCLOSURE

Small, finely divided, siliceous pigment is precipitated under circumstances to minimize or reduce the amount of water which is present in the filter cake when the precipitated silicate is filtered from the aqueous solution in which it is formed. The process is conducted by added acid to sodium silicate or like alkali metal silicate under conditions such as to produce a finely divided, recoverable silica pigment having an average ultimate particle size below about 500 angstroms, and controlling the temperature of the solution during acidification so that a portion of the acid is added at one temperature and another portion of the acid is added at a higher temperature, such higher temperature being established before all, and preferably before a major portion, of the silica has been precipitated from the solution. As a consequence of this process, the silica filter cake obtained has a higher concentration of solids and therefore a lower concentration of water.

---

This application is a continuation of Ser. No. 852,102, filed Aug. 21, 1969, now abandoned.

This invention provides an improved siliceous product useful as pigments in rubber, insecticides, paint, paper, and for other purposes, and an improved method of producing such products. As shown in U.S. Pat. No. 2,940,-830, granted to F. S. Thornhill, June 14, 1960, it is known to produce finely divided, white siliceous pigment by acidifying aqueous alkali metal silicate. The particle size and the surface area of the product may be controlled by adding the acid at a predetermined rate which depends upon the temperature and silica content of the solution. For an alkali metal silicate of given $SiO_2$ (or $Na_2O$) content and a given temperature and where a relatively fine pigment having an average ultimate particle size below 0.05 micron and a high surface area, for example, 100 to 500 (rarely in excess of 400) square meters per gram, is desired, the rate of acid addition is relatively fast, but not too fast. Where a more coarse product having a lower surface area, for example, 25 square meters per gram, is desired, the rate of acid addition is slower. If, however, the acid is added too fast, a product of surface area above 500 m.²/g., or even a gel, is obtained, which heretofore, when it is dried, is in the form of glassy particles or agglomerates not suitable as a pigment. The particular rate of addition required for a product of specifically desired particle size or surface area depends upon the concentration of silica in the solution, the temperature of the solution, and amount, if any, of soluble salts, particularly salts of strong acids (sulfate, chloride, nitrate, etc.) in the solution.

For a given fixed uniform rate of adding the amount of acid required to neutralize the alkali metal silicate and precipitate the $SiO_2$ therein (other conditions being held constant):

(a) increase in temperature produces a coarser product with lower surface area, and reduction in temperature produces a finer product with higher surface area;
(b) increase in alkali metal silicate concentration within the range up to about 150 to 200 grams of $SiO_2$ per liter produces a coarser product with higher surface area, and decrease in alkali metal silicate produces a finer product with lower surface area;
(c) increase in salt concentration, e.g., NaCl, $Na_2SO_4$, or other soluble salt of inorganic acid or organic acid stronger than silicic acid, produces a coarser product with higher surface area, and decrease in such salt concentration produces a finer product with lower surface area.

Also, as the rate of acid addition is decreased, a coarser product with lower surface area is obtained, and when it is increased, a finer product with higher surface area is obtained for a solution of fixed temperature, silicate concentration and salt concentration.

The rate of acid addition is of major importance until about 50–60% of the acid required to neutralize the alkali, e.g., $Na_2O$, of the alkali metal silicates has been added or until enough acid has been added to precipitate the major part of substantially all of the silica ($SiO_2$) in solution. Thus, the rate of acid addition during the last half or the final stages of neutralization does not have as much effect upon the particle size of the precipitated silica, although it may have an effect on other properties. Silica ranging in particle size from as low 30 angstroms to as high as one micron (1000 angstroms) may be so precipitated, although these factors are especially important where it is desired to produce a pigment having an average ultimate particle size below 0.1 micron, and preferably below 0.05 micron.

All of this is explained in the aforesaid U.S. Letters Patent of Thornhill, the disclosure of which is incorporated herein by reference.

In practice of the above process, the alkali metal silicate begins to exhibit a slight milky color after about 30 to 40 percent of the molecular equivalent of the acid corresponding to the number of moles of silicate in solution has been added, and precipitation is largely complete after about 50 to 60 percent of such amount of acid has been added. Thus, precipitation begins when the ratio of $SiO_2$ to $M_2O$ is in the range of about 4.7 to 6, and is largely completed when this ratio is in the range of 7.5 to 8.5 $SiO_2$ per $M_2O$, M being sodium, potassium or other alkali metal of the alkali metal silicate.

As a consequence of the acidification process, silica is not only precipitated, but the alkali of the silicate is gradually neutralized. As a general rule, this neutralization is carried out to a point where the $M_2O$ or $Na_2O$ of the alkali metal silicate (M being the alkali metal) of the ultimate silica produced is less than about 2% by weight and generally is less than about 1%. Thus, as a general rule, acid is added until the alkali is largely neutralized, say to a pH below about 8.5 or 9, and then the resulting slurry is treated by filtration and/or washing, for example, in Dorr-type thickeners, to wash out dissolved salts. Thereafter, the product is recovered by filtration and is dried.

Filtration of this type of siliceous product results in the production of filter cakes which contain a surprisingly high amount of water. The exact amount of water present depends to a fair degree upon the coarseness of the particles. For example, when the silica has an average ultimate particle size of about 325 to 550 angstroms, and particularly when the surface area of the product is in the range of 50 to 75 square meters per gram measured according to the B.E.T. method, the solids content of the resulting filter cake (that is, the silica pigment content thereof) is usually above 18%, but rarely exceeds about 20 to 23% by weight. Such solids content is determined by drying the pigment at 100° C. to constant weight. This is particularly true when the silica is filtered below a pH of 9, for example, at a pH of 5 to 8.5.

The finer silicas having an average ultimate particle size of 300 angstroms or below, for example, 35 to 250 angstroms, when filtered, have an even higher water content and correspondingly lower solids content. Thus, a typical slurry having an average ultimate particle size of 150 to 250 angstroms, when filtered, usually contains in the range of only 12 to 16% by weight of solids.

According to the present invention, it has been found that the water content of filter cakes of such silica may be improved by conducting the acidification and/or precipitation of the silica at more than one temperature. Thus, when the addition of acidification agent to the alkali metal silicate aqueous solution is initiated, it may be at a relatively low temperature. However, after a substantial portion of acid has been added and before all of the acid has been added and all of the silica has been precipitated, the temperature of the silicate solution should be raised. By performing this, it is possible to achieve an appreciable increase in the solids content of the resulting siliceous filter cake.

Simply by raising the solids content from 16 to 18%, one needs to evaporate only about 4.55 pounds of water per pound of pigment, as compared with 5.5 pounds of water per pound of dry pigment at 16% solids. Since the evaporation of water is costly, the advantage may be readily appreciated.

The time when the temperature should be raised is important. If desired, there may be a continuous raise in temperature, for example, at the rate of 0.1 to 1° C. per minute, during the entire period of addition of acid and until the silica is essentially completely precipitated, i.e., until the ratio of $SiO_2$ to $M_2O$ is about 8.5 $SiO_2$ per $M_2O$, M being sodium, potassium or other alkali metal. However, it is not necessary to continuously raise the temperature since the reaction may be conducted in stages at increasing temperatures; for example, the first 20 to 30% of the acid required to neutralize the alkali of the silicate may be added at one relatively low temperature. Thereafter, the temperature may be raised and addition of acid continued until all of the silica has been precipitated.

As a further embodiment, the temperature rise may be in three or more stages. At all events, the temperature during the precipitation of the final 25% of the silica should be at least 5° C., and preferably should be at least 10° C. above the temperature of the solution when the acid is first added to the sodium silicate. The final temperature rarely exceeds 60° C. above the initial temperature. Sodium silicate used usually is formed by reaction of caustic soda or sodium carbonate with sand at temperatures above 200° C. Silicates of this type have the composition $M_2O(SiO_2)_x$, where $x$ is a small number ranging from below 1 to as high as about 4. As an aqueous solution of such a silicate is treated with acid, it is apparent that the ratio of $SiO_2$ changes due to neutralization of the alkali of the silicate. Where a strong acid is added, the result is to produce a neutral salt and the residual unreacted $Na_2O$ (or $M_2O$) of the alkali metal silicate may be determined by ordinary titration in order to determine the $SiO_2/M_2O$ ratio. However, where a weak acid or its anhydride, such as carbon dioxide, is used, the result is to form an alkaline salt. Consequently, titration is not then a reliable method for determining the $M_2O$ of the silicate reacted or the percent thereof remaining unreacted. In that case, the amount of carbon dioxide dissolved in the solution may be determined by acidifying a sample thereof with a strong acid and measuring the amount of $CO_2$ driven off. Alternately, the amount of unreacted $Na_2O$ of the silicate may be calculated from the amount of acid added to the silicate solution.

At all events, as the acid is added, the ratio of $SiO_2$ to $Na_2O$ (or $M_2O$) increases. For example, when an aqueous solution of the sodium silicate $Na_2O(SiO_2)_{3.3}$ is treated with enough acid to neutralize one-half of the $Na_2O$, the $SiO_2$ to $Na_2O$ ratio then rises to 6.6.

In the practice of the present process, the temperature of the solution undergoing acidification, while the ratio is in the range of 6.6 to 8.5 moles of $SiO_2$ per mole of $Na_2O$ or equivalent alkali metal oxide, should be at least about 5° C., and preferably in excess of 10° C., above the temperature of the solution when the ratio of $SiO_2$ to $Na_2O$ is 4.1 to 4.4.

The following example is illustrated:

EXAMPLE I

A series of 16-liter batches were run. In each batch, the concentration of sodium silicate $Na_2O(SiO_2)_{3.3}$ was 30 grams of $Na_2O$ per liter as sodium silicate. The reactor was a 20-liter enameled kettle equipped with a stirrer, a thermometer, and a carbon dioxide inlet tube. It also was provided with a heating coil to control the temperature within the reaction mixture. In four batches, the temperature of the solution was held constant within + or −1° C. In four of the batches, the temperature was gradually increased while carbon dioxide was added. In two of these batches, Samples A and B, carbon dioxide was introduced into the sodium silicate during agitation while the temperature was raised at a rate of 0.2 and 0.3° C., respectively, per minute, starting with the beginning of carbonation at 40° C. and continuing until a final temperature of 90° C. was obtained. For the other two batches, Samples D and E, faster rates of 0.5 and 1° C. per minute increase in temperature were resorted to, but the temperature rise was not started until just prior to the expected point of initial precipitation. When the reaction solution reached the initial reaction temperature, carbon dioxide was introduced continuously into the stirred silicate at the rate of about 1.5 cubic feet per hour. Carbon dioxide was also introduced into the Runs F, G, H, and I, when the temperature was held at 40°, 40°, 70° and 90° C., respectively, as shown in the table.

Enough carbon dioxide was introduced to neutralize all of the $Na_2O$ in all cases.

Following carbonation, the slurries were each boiled for one hour, filtered, then washed by displacement with distilled water. They were then reslurried, a small amount of each sample was recovered and dried for determination of surface area, while the main proportion was adjusted with HCl to pH 4, filtered, washed, and dried over-night at 105° C. The solids content of the filter cake of each run was determined. Also, the particle sizes of the dried products were determined, The results are shown in the following table:

TABLE I

| Sample No | Rate[1] of CO$_2$ introduction to add all CO$_2$ required for complete neutralization | Temp. range, °C. | Carbonation[1] range over which temp. changed | Initial precipitation at— | | Surface area BET, m.$^2$/g. | Predominant size range, A. | Percent by weight solids content of filter cake |
|---|---|---|---|---|---|---|---|---|
| | | | | Temp., °C. | Percent neutralization of Na$_2$O | | | |
| A | 4.2 | 40–90 | 0–100 | 61 | 41 | 141 | 180–280 | 20.2 |
| B | 4.5 | 40–90 | 0–62 | 72 | 40 | 108 | 200–300 | 25.0 |
| D | 4.5 | 40–90 | 38–78 | 43 | 40 | 180 | 180–220 | 18.8 |
| E | 4.3 | 40–90 | 39–59 | 48 | 42 | 176 | 160–200 | 18.2 |
| F | 5.4 | 40 | | | 40 | 50 | 161 | 160–210 | 16.5 |
| G | 4.3 | 40 | | | 40 | 46 | 209 | 120–180 | 17.2 |
| H | 3.8 | 70 | | | 70 | 41 | 112 | 220–300 | 18.7 |
| I | 4.4 | 90 | | | 90 | 25 | 35 | 500–700 | 25.3 |

[1] These values were calculated on the basis of percent carbonation analyses of slurry samples taken at a point near the end of the carbonation and on an assumed uniform CO$_2$ absorption efficiency.

From the above table, it will be noted that the samples in which the temperature was raised generally contained an increase in solids content. The sole exceptions to this are Samples H and I, where coarser products were obtained. Here, comparing Sample H with Sample B, the same solids content of filter cake was obtained in Sample B despite the fact that the particle size was much smaller. Also, note that Sample B contained a much higher solids content than Sample H.

Although in the above examples the temperature was raised more or less uniformly from the lower temperature to the higher maximum temperature, this is not necessary. For example, it is possible to perform the above tests by conducting the carbonation, say at 40° C., until about 40% of the Na$_2$O has been neutralized and thereafter rapidly raising the temperature as fast as possible to 90° C. and adding the carbon dioxide not only during the 5 or 10 minutes required to raise the temperature of the solution, but also after this period.

It is to be understood that sodium silicate other than the one corresponding to the formula Na$_2$O(SiO$_2$)$_{3.3}$ may be used. For example, any of the other sodium silicates corresponding to the formula Na$_2$O(SiO$_2$)$_x$, where $x$ is a number including fractional numbers from 0.5 to about 4, may be used in lieu of the sodium silicate referred to in the above examples. Also, the corresponding potassium silicates may be used.

In all of these cases the temperature control is achieved in the same SiO$_2$/Na$_2$O (or M$_2$O) ratios, as discussed above.

While carbon dioxide or carbonic acid is an effective acid for the purpose of acidifying the alkali metal silicate, other acids or their anhydrides, including sulfuric acid, sulfurous acid or their anhydrides SO$_2$ and SO$_3$, and nitric acid or acidic oxides of nitrogen, or phosphoric acid or phosphorous acid anhydrides, acetic acid, hydrochloric acid, or acidic acids such as chlorine or carbon monoxide, or other water soluble mineral acid or organic acid may be used for this purpose.

The alkali metal silicate solution may, if desired, contain up to 50 grams per liter of a salt of a strong acid, such as a chloride, sulfate, sulfite or nitrate of alkali metal, including potassium, sodium or lithium. In such a case, the rate of addition is adjusted with respect to temperature, silicate concentration and salt concentration, as described above or in U.S. Pat. No. 2,940,830, to obtain silica having the desired surface area or particle size with the temperature adjustment as herein contemplated.

Reference has been made herein to surface area of pigments. This surface area is obtained by degassing the silica (previously dried at 105° C.) in vacuum to remove residual or entrapped gas therein and then measuring the amount of nitrogen which is absorbed by or adsorbed by the silica under controlled temperature and pressure. The surface area is computed from this amount. This method is commonly called the Brunauer-Emmett-Teller method and is described in the article in Journal of the American Chemical Society, volume 60, page 309 et seq. (February 1938).

Although the present invention has been described with reference to the specific details of certain embodiments thereof, it is not intended that such details shall be regarded as limitations upon the scope of the invention except insofar as included in the accompanying claims.

I claim:

1. In the process of producing finely-divided silica by adding acidification agent to aqueous alkali metal silicate at a rate to precipitate silica having an average ultimate particle size of 35 to 500 angstroms and to neutralize alkali of said silicate and recovering the silica thus precipitated, the improvement which comprises conducting the precipitation of the final 25 percent of the silica at a temperature at least 5° C. higher than the temperature of the solution when the acidification agent is first added.

2. The process of claim 1 wherein the precipitation is conducted at a temperature at least 5° C. higher than the temperature of the solution when the acidification is first added before more than 50 percent of the silica has been precipitated.

3. The process of claim 1 wherein precipitation is conducted at a temperature higher when the ratio of SiO$_2$ to M$_2$O is in the range of 6.6 to 8.5 than when said ratio is 4.1 to 4.4, M being alkali metal of the silicate.

4. The process of claim 3 wherein the silicate is sodium silicate.

5. The process of claim 1 wherein the resulting slurry is filtered to produce a filter cake of increased solids content over that obtained when the temperature is not raised and silica of the same particle size is precipitated.

6. The process of claim 1 wherein the temperature of the reaction mixture thus produced during the precipitation of the last 25 percent by weight of the silica of the sodium silicate is at least 50° C. higher than the temperature at which the acid is added to neutralize the first 20 percent of the alkali metal oxide of said silica.

7. The process of claim 1 wherein the temperature during the precipitation of the final 25 percent of the silica is at least 10° C. above the temperature of the solution when the acid is first added.

8. The process of claim 1 wherein the temperature during the precipitation of the final 25 percent of the silica is between 10° C. and 60° C. above the temperature of the solution when the acid is first added.

References Cited

UNITED STATES PATENTS

| 2,940,830 | 6/1960 | Thornhill | 23—182 R |
| 3,085,861 | 4/1963 | Thornhill et al. | 23—182 R |

EDWARD STERN, Primary Examiner

U.S. Cl. .R.

106—288 B